US012641346B2

(12) United States Patent
Ollila

(10) Patent No.: US 12,641,346 B2
(45) Date of Patent: May 26, 2026

(54) HIGH-DYNAMIC RANGE IMAGING USING PARTIAL POLARISATION MASK

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 241 days.

(21) Appl. No.: 18/397,188

(22) Filed: Dec. 27, 2023

(65) Prior Publication Data

US 2025/0220315 A1      Jul. 3, 2025

(51) Int. Cl.
*H04N 23/741* (2023.01)
*H04N 23/75* (2023.01)
*H04N 25/13* (2023.01)

(52) U.S. Cl.
CPC ......... *H04N 25/134* (2023.01); *H04N 23/741* (2023.01); *H04N 23/75* (2023.01)

(58) Field of Classification Search
CPC .... H04N 25/134; H04N 23/741; H04N 23/75; H04N 23/843; H04N 25/445; H04N 25/48; H04N 25/585; H04N 25/704; H04N 25/11
See application file for complete search history.

(56) References Cited

U.S. PATENT DOCUMENTS

2018/0302597 A1    10/2018  Honda et al.
2019/0260974 A1*   8/2019  Kaizu .................... H04N 23/72

2020/0234402 A1*   7/2020  Schwartz ................. G06N 3/08
2020/0350353 A1   11/2020  Kurita et al.
2021/0266425 A1    8/2021  Nakata et al.
2021/0306584 A1*   9/2021  Moriyama ........... G02B 5/3058
2022/0132014 A1*   4/2022  Nagata ................... G03B 35/08
2022/0210322 A1*   6/2022  Hirasawa ................. G06T 5/50

FOREIGN PATENT DOCUMENTS

JP          2014164231 A        9/2014

OTHER PUBLICATIONS

European Patent Office, Extended European Search Report, Application No. 24215720.4, Mailed Apr. 16, 2025, 9 pages.

* cited by examiner

*Primary Examiner* — Twyler L Haskins
*Assistant Examiner* — Surafel Yilmakassaye
(74) *Attorney, Agent, or Firm* — Ziegler IP Law Group, LLC.

(57)          ABSTRACT

Disclosed is an imaging system with an image sensor and processor(s). The image sensor has a plurality of photo-sensitive cells arranged on a photo-sensitive surface of the image sensor; a colour filter array with colour filters of at least three different colours; and a polarisation mask with polarisation filters arranged on an optical path of at most a first predefined percent of the colour filters. The processor(s) is/are configured to: read out image data from the image sensor; and process the image data to generate at least one of: a full-resolution colour image, a full-resolution polarisation image, a high-dynamic range (HDR) image.

12 Claims, 5 Drawing Sheets

300

302

400

402

404

HIGH-DYNAMIC RANGE IMAGING USING PARTIAL POLARISATION MASK

TECHNICAL FIELD

The present disclosure relates to imaging systems incorporating partial polarisation masks for high-dynamic range (HDR) imaging. The present disclosure also relates to methods for HDR imaging using partial polarisation masks.

BACKGROUND

Nowadays, with an increase in the number of images being captured every day, there is an increased demand for developments in image processing. Such a demand is quite high and critical in case of evolving technologies such as immersive extended-reality (XR) technologies which are being employed in various fields such as entertainment, training, medical imaging operations, simulators, navigation, and the like. Such a demand is also high in case of polarisation imaging technology, which is typically employed in various applications, for example, such as material characterisation, stress recognition, object detection, and the like. Several advancements are being made to develop image generation technology.

However, existing image generation technology has certain problems associated therewith. Existing image sensors are often employed for capturing colour images by detecting light incoming from a real-world environment regardless of its polarisation state, and then capturing corresponding image signals. Such colour images cannot be utilised in various applications, for example, such as material characterisation. Some existing image generation technologies utilise polarisation pixels in image sensors, for capturing polarisation image data, which enables material characterisation. However, such image sensors are extremely prone to inaccurately capturing colour image data or poorly reproducing colours in images as they appear in a real-world scene of the real-world environment. Resultantly, this drastically reduces an overall image quality (for example, in terms of a low resolution, low contrast, poor colour reproduction, high noise and the like) of an image. As a result, separate image sensors are required for capturing colour images and polarisation images.

Furthermore, other existing image generation technologies require at least two images captured at different exposure settings for generating a high-dynamic range (HDR) image. However, this requires considerable processing resources, involves a long processing time, and requires high computing power. Moreover, the existing image generation technology is not well-suited for generating HDR images along with fulfilling other requirements in XR devices, for example, such as small pixel size and high frame-rate requirements. Resultantly, generated images lack high visual quality, are often generated with considerable latency/delay, thereby leading to a poor, non-immersive viewing experience for a user.

Therefore, in light of the foregoing discussion, there exists a need to overcome the aforementioned drawbacks.

SUMMARY

The present disclosure seeks to provide a system and a method to generate at least one of: a full-resolution colour image, a full-resolution polarisation image, a high-dynamic range (HDR) image, using a same image sensor in a highly realistic manner, and in computationally-efficient and time-efficient manner. The aim of the present disclosure is achieved by an imaging system and a method which utilise an image sensor incorporating a partial polarisation mask for HDR imaging, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIGS. 7A and 7B illustrate how first image data and second image data are read out from a portion of a photo-sensitive surface of an image sensor for capturing a first sub-image and a second sub-image, respectively, while

DETAILED DESCRIPTION OF EMBODIMENTS

Figure 1:
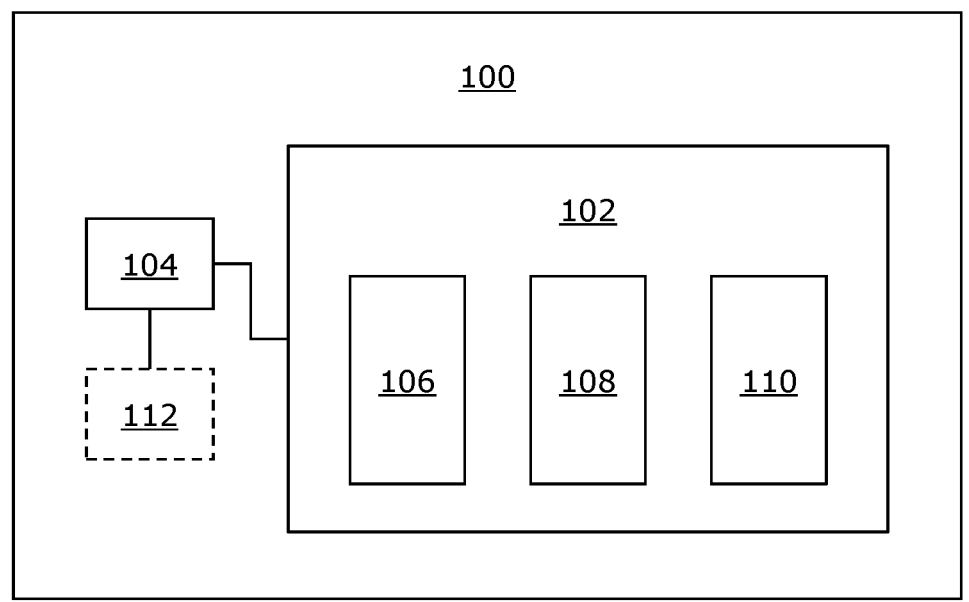
FIG. 1 illustrates a block diagram of an architecture of an imaging system incorporating a partial polarisation mask for high-dynamic range (HDR) imaging, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an imaging system comprising:
    an image sensor comprising:
        a plurality of photo-sensitive cells arranged on a photo-
            sensitive surface of the image sensor;

a colour filter array comprising colour filters of at least three different colours; and a polarisation mask comprising polarisation filters arranged on an optical path of at most a first predefined percent of the colour filters; and at least one processor configured to:

read out image data from the image sensor; and process the image data to generate at least one of: a full-resolution colour image, a full-resolution polarisation image, a high-dynamic range (HDR) image.

In a second aspect, an embodiment of the present disclosure provides a method comprising:

reading out image data from an image sensor, wherein the image sensor comprises: a plurality of photo-sensitive cells arranged on a photo-sensitive surface of the image sensor; a colour filter array comprising colour filters of at least three different colours; and a polarisation mask comprising polarisation filters arranged on an optical path of at most a first predefined percent of the colour filters; and processing the image data to generate at least one of: a full-resolution colour image, a full-resolution polarisation image, a high-dynamic range (HDR) image.

The present disclosure provides the aforementioned imaging system and the aforementioned method utilising an image sensor incorporating a partial polarisation mask, to generate at least one of: the full-resolution colour image, the full-resolution polarisation image, the HDR image, in a highly realistic manner, and in computationally-efficient and time-efficient manner. Herein, the polarisation mask comprising the polarisation filters is arranged on the optical path of some of the colour filters of the CFA, thereby enabling the at least one processor to read out image data from photo-sensitive cells that correspond to the colour filters on whose optical path the polarisation filters (namely, to obtain polarisation image data) are arranged as well as from photo-sensitive cells that correspond to remaining colour filters on whose optical path the polarisation filters are not arranged (namely, to obtain colour image data). Beneficially, this facilitates in accurately and realistically generating any of the aforesaid images. Moreover, arranging the polarisation filters and colour filters in the aforesaid manner enables the at least one processor to accurately capture the colour image data and the polarisation image data, in order to accurately reproduce colours (or unread/incomplete image data) in any of the aforesaid images, without compromising on image quality. Furthermore, the colour image data can be understood to be read out using a first setting (due to absence of the polarisation filters), whereas the polarisation image data can be understood to be read out using a second setting (due to presence of the polarisation filters), wherein the first setting and the second setting are two different settings that may pertain to at least one of: an exposure time, a sensitivity, an aperture size. Advantageously, this facilitates in generating the HDR image by processing the image data obtained for a single image, without requiring image data of at least two images (as in case of the prior art). The imaging system and the method are susceptible for generating HDR images along with fulfilling other requirements in XR devices, for example, such as small pixel size and high frame-rate requirements. The imaging system and the method are simple, robust, fast, reliable, supports real time HDR imaging using partial polarisation mask, and can be implemented with ease. It will be appreciated that in order to achieve the aforementioned technical benefits, the polarisation filters of the polarisation mask are arranged in a distributed manner across an entirety of the photo-sensitive surface.

Throughout the present disclosure, the term "image sensor" refers to a device that detects light from a real-world environment at the plurality of photo-sensitive cells (namely, a plurality of pixels) to capture a plurality of image signals. The plurality of image signals are electrical signals pertaining to a real-world scene of the real-world environment. The plurality of image signals constitute the image data of the plurality of photo-sensitive cells. Examples of the image sensor include, but are not limited to, a charge-coupled device (CCD) image sensor, and a complementary metal-oxide-semiconductor (CMOS) image sensor. Image sensors are well-known in the art.

Throughout the present disclosure, the term "image data" refers to information pertaining to a given photo-sensitive cell of the image sensor, wherein said information comprises at least one of: a colour value of the given photo-sensitive cell, a polarisation value of the given photo-sensitive cell. Optionally, said information further comprises at least one of: a depth value of the given photo-sensitive cell, a transparency value of the given photo-sensitive cell, a luminance value (namely, a brightness value) of the given photo-sensitive cell.

The colour value could, for example, be Red-Green-Blue (RGB) values, Red-Green-Blue-Alpha (RGB-A) values, Cyan-Magenta-Yellow-Black (CMYK) values, Red-Green-Blue-Depth (RGB-D) values, Red-Green-Blue-White (RGBW) values, Red-Yellow-Yellow-Blue (RYYB) values, Red-Green-Green-Blue (RGGB) values, Red-Clear-Clear-Blue (RCCB) values, or the like. Accordingly, the image sensor can be implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera.

The polarization value is indicative of a polarization state of the light captured by the given photo-sensitive cell upon passing through a polarisation filter. It will be appreciated that the polarisation value could, for example, be expressed using at least one of: Stokes parameters, a degree of polarisation, a polarisation angle. Typically, the Stokes parameters comprise a set of four values 'I', 'Q', 'U', and 'V' that describe the polarization state of the light, wherein 'I' refers to a total intensity of the light, 'Q' and 'U' refer to linear polarization components, 'V' refers to a circular polarization component. The degree of polarisation is indicative of a portion of the light which is polarized, and typically lies in a range of 0 (indicating completely unpolarized light) to 1 (indicating fully polarized light). The degree of polarisation may be determined based on the Stokes parameters. The degree of polarisation encompasses at least a degree of linearly polarised light (DoLP). The polarisation angle refers to an orientation of polarized light (that is typically measured in degrees). The polarization value and its representation are well-known in the art.

In some implementations, the image data is RAW image data that has been read out from the image sensor. The term "RAW image data" refers to image data that is unprocessed (or may be minimally processed) when obtained from the image sensor. In other implementations, the image data is partially-processed image data that is generated upon performing certain image signal processing (ISP) on the RAW image data, for example, in an ISP pipeline. The image data and its forms (such as the RAW image data) are well-known in the art.

It will be appreciated that the plurality of photo-sensitive cells could, for example, be arranged in a rectangular two-dimensional (2D) grid, a polygonal arrangement, a circular arrangement, an elliptical arrangement, a freeform arrangement, or the like, on the image sensor. In an example, the image sensor may comprise 25 megapixels arranged in the rectangular 2D grid (such as a 5000×5000 grid) on the photo-sensitive surface. Optionally, when the plurality of photo-sensitive cells are arranged in the rectangular 2D grid, the image data is read out in a line-by-line manner.

Throughout the present disclosure, the term "colour filter array" refers to a pattern of colour filters arranged in front of the plurality of photo-sensitive cells of the photo-sensitive surface, wherein the colour filter array (CFA) allows only specific wavelengths of light to pass through a given colour filter to reach a corresponding photo-sensitive cell of the photo-sensitive surface, for capturing corresponding image data. The CFA is well-known in the art. Typically, the photo-sensitive surface of the image sensor has millions of photo-sensitive cells.

It will be appreciated that the CFA comprises a plurality of smallest repeating unit, wherein a given smallest repeating unit is a smallest grid of colour filters that is repeated throughout the CFA. In other words, the smallest repeating unit may be understood as a building block that gets repeated (for example, horizontally and/or vertically) to form an entirety of the CFA. The given smallest repeating unit may, for example, be an M×N array of colour filters. In an example, for sake of better understanding and clarity, a given portion of the CFA may comprise 12 smallest repeating units arranged in a 3×4 array, wherein a given smallest repeating unit from amongst the 12 smallest repeating units is a 3×2 array of colour filters. In such an example, a given smallest repeating unit comprises 6 colour filters, and the CFA comprises 72 colour filters.

In some implementations, the colour filters of the at least three different colours comprise at least one blue colour filter, at least one green colour filter, and at least one red colour filter. In some examples, the at least one green colour filter could comprise at least two green colour filters. The colour filters of the at least three different colours could be similar to colour filters employed in a Bayer CFA. The Bayer CFA is well-known in the art. In other implementations, the colour filters of the at least three different colours comprise at least one cyan colour filter, at least one magenta colour filter, and at least one yellow colour filter. In some examples, the at least one magenta colour filter could comprise at least two magenta colour filters.

Optionally, the CFA further comprises at least one other colour filter that allows to pass through at least one of: (i) at least three wavelengths corresponding to respective ones of the at least three different colours, (ii) at least one infrared wavelength. It will be appreciated that the at least one other colour filter that allows to pass through the at least three wavelengths simultaneously, can be understood to be a white or near-white colour filter. Furthermore, the at least one other colour filter that allows to pass through the at least one infrared wavelength (for example, lying in an infrared wavelength range) can be understood to be an infrared colour filter.

Throughout the present disclosure, the term "polarization mask" refers to a physical mask comprising polarisation filters arranged on an optical path of corresponding colour filters, wherein a given polarisation filter allows light with only a specific polarization orientation to pass therethrough to reach a corresponding colour filter, while blocking light with other remaining polarization orientations. The polarisation mask and polarisation filters have been illustrated in conjunction with FIGS. 2 and 3, for sake of better understanding and clarity.

It will be appreciated that a polarisation filter may only allow horizontally-polarized light (namely, light with a 0-degree polarization angle (namely, polarization orientation)) to pass therethrough, and may be referred to as "horizontal polarisation filter". Similarly, a polarisation filter may only allow vertically-polarized light (namely, light with a 90-degrees polarization angle) to pass therethrough, and may be referred to as "vertical polarisation filter". A polarisation filter may only allow light with a 45-degrees polarization angle to pass therethrough, and may be referred to as "45-degrees polarisation filter". A polarisation filter may only allow light with a 135-degrees polarization angle to pass therethrough, and may be referred to as "135-degrees polarisation filter". It is to be understood that the polarisation mask need not necessarily comprise polarisation filters of a same type, and preferably comprise different types of polarisation filters. Moreover, the phrase "at most a first predefined percent of the colour filters" means that the polarisation filters would be arranged on the optical path of only some of the colour filters of the CFA, and would not be arranged on the optical path of an entirety of the colour filters of the CFA. In this way, the polarisation mask is implemented as a partial polarisation mask. It will be appreciated that the colour filters on whose optical path the polarisation filters are arranged could have different colours from other colour filters. In other words, it would be advantageous when the polarisation filters are arranged on the optical path of colour filters having different colours, instead of the polarisation filters being arranged on the optical path of colour filters having a same colour. This potentially provides improved colour reproduction, when the image data would be processed. Optionally, the first predefined percent lies in a range of 30 percent to 60 percent of the colour filters of the CFA. More optionally, the first predefined percent lies in a range of 40 percent to 50 percent of the colour filters of the CFA. In an example, the CFA may comprise 64 colour filters, and the polarisation filters may be arranged on the optical path of at most 32 colour filters (i.e., at most 50 percent of the 64 colour filters) of the CFA. In such an example, the polarisation filters may be arranged on the optical path of 32 colour filters or less than 32 colour filters (for example, such as 10, 16, 20, or 25 colour filters), but would not be arranged on the optical path of more than 32 colour filters. In some implementations, the polarisation mask and the CFA are integrated together. This has been illustrated in conjunction with FIG. 3, for sake of better understanding and clarity. In other implementations, the polarisation mask and the CFA are separate. This has been illustrated in conjunction with FIG. 2, for sake of better understanding and clarity.

Notably, the at least one processor controls an overall operation of the imaging system. The at least one processor is communicably coupled to at least the image sensor. Optionally, the at least one processor is implemented as an image signal processor. In an example, the image signal processor may be a programmable digital signal processor (DSP). Alternatively, optionally, the at least one processor is implemented as a cloud server (namely, a remote server) that provides a cloud computing service.

Notably, the image data is read out by the at least one processor. In particular, the image sensor reads out a given photo-sensitive cell from the photo-sensitive surface, wherein when reading out, an image signal captured by said given photo-sensitive cell is processed. In some implementations, the image data is (fully) sampled image data. This means the at least one processor reads out all photo-sensitive cells from the photo-sensitive surface. In other implementations, the image data is subsampled image data. This means the at least one processor reads out only some of the photo-sensitive cells from the photo-sensitive surface, instead of reading out from each photo-sensitive cell of the photo-sensitive surface. Reading out the image data and subsampling is well-known in the art.

Once the image data is read out, the image data is processed by the at least one processor to generate at least one of: the full-resolution colour image, the full-resolution polarisation image, the HDR image. Throughout the present disclosure, the term "colour image" refers to a visual representation of the real-world environment, wherein the visual representation encompasses colour information represented in the colour image, and additionally optionally other attributes (for example, such as depth information, luminance information, transparency information (namely, alpha values), and the like) associated with the colour image. Throughout the present disclosure, the term "polarisation image" refers to a visual representation of the real-world environment, wherein the visual representation encompasses polarization information represented in the polarisation image, and additionally optionally other attributes associated with the polarisation image (for example, such as colour information, and the like). The polarization information may comprise intensity and polarization characteristics of light across a real-world scene of the real-world environment. Typically, polarisation images are employed in various applications, for example, such as material detection and segmentation (without any flares/reflections), visual inspection, remote sensing, detection of fine scratches on objects (due to contrast enhancement), stress recognition, object detection, and the like. Moreover, the term "full-resolution image" refers to an image having a highest resolution (for example, in terms of pixel per degree (PPD)) that is obtainable from the image sensor. The highest resolution is the maximum possible resolution for the image sensor, and depends on the total number of photo-sensitive cells in the image sensor. Herein, the term "image" encompasses a colour image and/or a polarisation image. Throughout the present disclosure, the term "high-dynamic range image" refers to an image having HDR characteristics. The HDR image represents a real-world scene being captured using a broader range of brightness levels, as compared to a standard image. This facilitates in an improved, accurate representation of a dynamic range of the real-world scene, thereby providing enhanced contrast and high visual detail in captured HDR image. The full-resolution colour image and/or the HDR image could, for example, be displayed to a user of a client device. Moreover, the full-resolution colour image and/or the HDR image may further be processed to generate an extended-reality (XR) image, to be shown to said user. The client device could be implemented, for example, as a head-mounted display (HMD) device. The term "head-mounted display" device refers to specialized equipment that is configured to present an XR environment to a user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses augmented reality (AR), mixed reality (MR), and the like. The colour image, the polarisation image, and the HDR image are well-known in the art.

It will be appreciated that since the image data that has been read out comprises image data corresponding to colour filters on whose optical path the polarisation filters are arranged as well as image data corresponding to remaining colour filters on whose optical path the polarisation filters are not arranged, it is feasible for the at least one processor to accurately and realistically generate at least one of: the full-resolution colour image, the full-resolution polarisation image, the HDR image. In an example, the full-resolution colour image could be generated by utilising at least the image data corresponding to remaining colour filters on whose optical path the polarisation filters are not arranged (namely, colour image data), and optionally the image data corresponding to the colour filters on whose optical path the polarisation filters are arranged (namely, polarisation image data). In another example, the full-resolution polarisation image could be generated by utilising at least the polarisation image data, and optionally the colour image data. In yet another example, the HDR image could be generated by utilising the colour image data and the polarisation image data. This is because for the colour image data, those photo-sensitive cells that correspond to the remaining colour filters on whose optical path the polarisation filters are not arranged can be understood to be read out using a first setting (due to absence of the polarisation filters), whereas for the polarisation image data, those photo-sensitive cells that correspond to the colour filters on whose optical path the polarisation filters are arranged can be understood to be read out using a second setting (due to presence of the polarisation filters), wherein the first setting and the second setting are two different settings that may pertain to at least one of: an exposure time, a sensitivity, an aperture size. Beneficially, this facilitates in generating the HDR image (as discussed later).

Optionally, when processing the image data, the at least one processor is configured to perform interpolation and demosaicking on a part of the image data that is read out from those photo-sensitive cells that correspond to remaining colour filters on whose optical path the polarisation filters are not arranged, to generate the full-resolution colour image. In this regard, said part of the image data is utilised for generating the full-resolution colour image, while another part of the image data that is read out from those photo-sensitive cells that correspond to the colour filters on whose optical path the polarisation filters are arranged may or may not be utilised (namely, taken into account) at all. Optionally, said part of the image data comprises at least colour values of the photo-sensitive cells.

It will be appreciated that when the another part of the image data (that is read out from those photo-sensitive cells that correspond to the colour filters on whose optical path the polarisation filters are arranged) is not utilised (namely, taken into account), the at least one processor is configured to perform the interpolation on said part of the image data (that is read out from those photo-sensitive cells that correspond to the remaining colour filters on whose optical path the polarisation filters are not arranged) for generating the full-resolution colour image. The "interpolation" is a specialized process of reconstructing unread image data of some photo-sensitive cells of the photo-sensitive surface by using image data read out from other photo-sensitive cells of the photo-sensitive surface. The interpolation would be required when the another part of the image data is not taken into account, and said part of the image data is still sufficient for generating the full-resolution colour image. The interpolation is well-known in the art.

Optionally, the at least one processor performs the interpolation by employing at least one interpolation algorithm. Optionally, the at least one interpolation algorithm is at least one of: a bilinear interpolation algorithm, an edge-directed weighted-sum interpolation algorithm, a weighted sum interpolation algorithm, a local colour ratio (LCR) algorithm, a median-based interpolation algorithm, an average-based interpolation algorithm, a linear interpolation filtering algorithm, a cubic interpolation filtering algorithm, a four-nearest-neighbours interpolation filtering algorithm, a natural-neighbour interpolation filtering algorithm, a steering kernel regression interpolation filtering algorithm. The aforesaid interpolation algorithms are well-known in the art.

Optionally, upon performing the interpolation, the demosaicking is performed for generating a set of complete colour values (for example, such as RGB colour values or similar) for each photo-sensitive cell on the photo-sensitive surface. Such a set of complete colour values would be subsequently utilised for generating the full-resolution colour image. In some implementations, the interpolation is performed on said part of the image data prior to performing the demosaicking. In other implementations, the interpolation and the demosaicking are combined as a single operation, for example, when at least one neural network is to be employed (by the at least one processor) for performing the interpolation and the demosaicking (as discussed later). Some aforesaid interpolation algorithms could also be utilised for performing the demosaicking. The demosaicking is well-known in the art.

Optionally, the interpolation and the demosaicking are performed on said part of the image data, based on another part of the image data that is read out from those photo-sensitive cells that correspond to the colour filters on whose optical path the polarisation filters are arranged. In this regard, both said part of the image data and the another part of the image data are utilised for generating the full-resolution colour image. The another part of the image data comprises polarisation values of the photo-sensitive cells that correspond to the colour filters on whose optical path the polarisation filters are arranged, and additionally, comprises colour values of said photo-sensitive cells. Therefore, said colour values would be utilised by the at least one processor when performing the interpolation and the demosaicking on said part of the image data. Beneficially, this improves an accuracy of performing the interpolation and the demosaicking (for example, in terms of improved colour reproduction, high contrast, low noise, and the like), thereby generating the full-resolution colour image in a highly realistic manner (i.e., visual information represented in the full-resolution colour image would be highly accurate and realistic). It is to be understood that due to the presence of the polarization filters, said colour values may not be as highly accurate as colour values obtained for the photo-sensitive cells that correspond to the remaining colour filters on whose optical path the polarisation filters are not arranged, however, said colour values could still be beneficially utilised for performing the interpolation and the demosaicking.

Optionally, when processing the image data, the at least one processor is configured to perform interpolation and demosaicking on a part of the image data that is read out from those photo-sensitive cells that correspond to remaining colour filters on whose optical path the polarisation filters are not arranged, based on another part of the image data that is read out from those photo-sensitive cells that correspond to the colour filters on whose optical path the polarisation filters are arranged, using an HDR imaging technique, to generate the HDR image.

In this regard, both said part of the image data and the another part of the image data are utilised for generating the HDR image. As discussed earlier, those photo-sensitive cells that correspond to the remaining colour filters can be understood to be read out using a first setting (due to absence of the polarisation filters), whereas those photo-sensitive cells that correspond to said colour filters can be understood to be read out using a second setting (due to presence of the polarisation filters), the first setting and the second setting being two different settings that may pertain to at least one of: an exposure time, a sensitivity, an aperture size. For example, the photo-sensitive cells that correspond to the remaining colour filters may be understood to be read out using a full exposure setting, whereas the photo-sensitive cells that correspond to the said colour filters may be understood to be read out using a reduced exposure setting. Beneficially, due to this, when processing said part of the image data and the another part of the image data, the HDR imaging technique is effectively utilised for generating the HDR image. In other words, when said part of the image data is processed, the another part of the image data is utilised along with the HDR imaging technique. The interpolation and the demosaicking are performed on the part of the image data in a similar manner as described earlier.

Optionally, the HDR imaging technique comprises at least one of: an HDR tone-mapping technique, an HDR exposure bracketing technique, an HDR exposure fusion technique, a dual ISO technique, an edge-preserving filtering technique (for example, such as a guided image filtering technique). The aforesaid HDR imaging techniques and their utilisation for generating HDR images are well-known in the art. The HDR exposure fusion technique is described, for example, in "*Exposure Fusion*" by T. Mertens et al., published in 15th Pacific Conference on Computer Graphics and Applications (PG'07), pp. 382-390, 2007, which has been incorporated herein by reference. The guided image filtering technique is described, for example, in "*Image Fusion with Guided Filtering*" by Shutao Li et al., published in IEEE Transactions on Image Processing, Vol. 22, No. 7, pp. 2864-2875, July 2013, which has been incorporated herein by reference.

Optionally, when processing the image data, the at least one processor is configured to perform interpolation and demosaicking on the another part of the image data that is read out from those photo-sensitive cells that correspond to the colour filters on whose optical path the polarisation filters are arranged, to generate the full-resolution polarisation image. In this regard, the another part of the image data is utilised for generating the full-resolution polarisation image, while said part of the image data (that is read out from those photo-sensitive cells that correspond to the colour filters on whose optical path the polarisation filters are not arranged) may or may not be utilised (namely, taken into account) at all. The another part of the image data comprises at least polarisation values and colour values of the photo-sensitive cells. It will be appreciated that the interpolation would be required to be performed when said part of the image data is not taken into account, and the another part of the image data is still sufficient for generating the full-resolution polarisation image. It will also be appreciated that the at least one processor is configured to perform the interpolation and the demosaicking on another part of the image data in a similar manner, as discussed earlier with respect to said part of the image data.

Optionally, the interpolation and the demosaicking are performed on said another part of the image data, based on the part of the image data that is read out from those photo-sensitive cells that correspond to remaining colour filters on whose optical path the polarisation filters are not arranged. In this regard, both the another part of the image data and said part of the image data are utilised for generating the full-resolution polarisation image. Since said part of the image data comprises colour values of the photo-sensitive cells that correspond to the colour filters on whose optical path the polarisation filters are not arranged, and said colour values would be utilised by the at least one processor when performing the interpolation and the demosaicking on the another part of the image data. Beneficially, this improves an accuracy of performing the interpolation and the demosaicking (for example, in terms of improved colour reproduction), thereby generating the full-resolution polarisation image in a highly realistic manner (i.e., visual information represented in the full-resolution polarisation image would be highly accurate and realistic).

Optionally, the interpolation and the demosaicking are performed using at least one neural network. Optionally, in this regard, when processing the image data, the at least one processor is configured to use the at least one neural network for performing the interpolation and the demosaicking, to generate at least one of: the full-resolution colour image, the full-resolution polarisation image, the HDR image, wherein an input of the at least one neural network comprises at least one of: said part of the image data, the another part of the image data. The at least one neural network performs the interpolation and the demosaicking in a highly accurate manner, as compared to conventional techniques. It will be appreciated that the input is provided to the at least one neural network both in a training phase of the at least one neural network and in an inference phase of the at least one neural network (i.e., when the at least one neural is utilised after it has been trained). It will also be appreciated that when the at least one neural network is used, the interpolation and demosaicking (and optionally, the HDR imaging technique) could be combined as a single operation, unlike in the conventional techniques where the demosaicking and the interpolation (and optionally, and the HDR technique) are treated as separate operations and where information pertaining to linear or non-linear relationships between neighbouring photo-sensitive cells is necessary for performing these operations. The interpolation performed using the at least one neural network can be understood to be inpainting or hallucinating missing/unread image data. In addition to these operations, there could be various image enhancement or image restoration operations (as mentioned hereinbelow) that can be performed additionally and optionally, using the at least one neural network. In this way, the at least one neural network may be trained to generate acceptably accurate missing image data based on available image data, to generate at least one of: the full-resolution colour image, the full-resolution polarisation image, the HDR image. These operations can even be performed at different scales or levels of detail to enhance an overall visual quality of a given image.

Additionally, optionally, a training process of the at least one neural network involves utilising a loss function that is generated based on perceptual factors and contextual factors. Such a loss function would be different from a loss function utilised in the conventional techniques. Perceptual loss factors may relate to visual perception of a generated given image. Instead of solely considering pixel-level differences, perceptual loss factors aim to measure a similarity in terms of higher-level visual features of a given image. Contextual loss factors may take into account a relationship and a coherence between neighbouring pixels in the given image. By incorporating the perceptual factors and the contextual factors into the training process, the at least one neural network can produce a visually-pleasing and contextually-coherent result. It will be appreciated that the loss function of the at least one neural network could optionally also take into account various image enhancement/restoration operations beyond just the demosaicking and the interpolation; the various image enhancement/restoration operations may, for example, include at least one of: deblurring, contrast enhancement, low-light enhancement, exposure correction, tone mapping, colour conversion, white balancing, super-resolution, compression.

Moreover, in an embodiment, the imaging system further comprises a wobulator that is to be employed to perform sub-pixel shifts when capturing sub-images with the image sensor, wherein the at least one processor is configured to:

when reading out the image data, obtain a first sub-image and a second sub-image from the image sensor, the image data comprising first image data and second image data corresponding to the first sub-image and the second sub-image, respectively, wherein when obtaining, the at least one processor is configured to:

for the first sub-image, read out the first image data from those photo-sensitive cells that correspond to the colour filters on whose optical path the polarisation filters are arranged and remaining colour filters on whose optical path the polarisation filters are not arranged; and for the second sub-image, read out the second image data from those photo-sensitive cells that correspond to the remaining colour filters on whose optical path the polarisation filters are not arranged, whilst skipping reading out from those photo-sensitive cells that correspond to the colour filters on whose optical path the polarisation filters are arranged;

control the wobulator to perform a sub-pixel shift between the first sub-image and the second sub-image; and when processing the image data, process the first sub-image and the second sub-image, to generate at least one of: the full-resolution colour image, the full-resolution polarisation image, the HDR image.

Herein, the term "wobulator" refers to a device that is capable of performing sub-pixel shifts. The term "sub-pixel shift" refers to a pixel-level movement (namely, a pixel-level shifting) of the image sensor (or light incoming towards the image sensor) in a particular direction, for capturing a given sub-image with the image sensor. It will be appreciated that a given sub-pixel shift could be performed, for example, by physically moving the image sensor and/or its corresponding optics (which may comprise optical elements, for example, such as lens, mirrors, and the like) by a given step size in a particular direction, or by optically steering the light (incoming towards the image sensor) by a given step size in a particular direction. The image sensor and/or the optics could be physically moved (namely, tilted and/or shifted) by the wobulator, for example, by way of using an actuator. In this regard, the wobulator may comprise at least the actuator. The optical steering could, for example, be done by way of using a liquid crystal device, a mems-actuated soft polymer, a micromirror, a lens, a liquid lens, adaptive optics and the like. It will be appreciated that the sub-pixel shifting (namely, the wobulation) could be performed by physically moving (in a horizontal direction and/or a vertical direction) or tilting only one optical element of the optics, in addition to physically moving the image sensor. Alternatively, the sub-pixel shifting (namely, the wobulation) could be performed by physically moving or tilting an entirety of the optics, for example, using an electromagnetic actuator (such as a voice coil motor), in addition to physically moving the image sensor. Wobulators are well-known in the art. Information pertaining to step sizes will be explained later.

In some implementations, when only one sub-pixel shift is performed by the wobulator in one cycle of capturing sub-images, two sub-images are obtained from the image sensor. In other words, the two (different) sub-images are captured by the image sensor using the one sub-pixel shift, wherein a first sub-image from amongst the two sub-images is captured when the image sensor is at its actual (namely, original) position (i.e., the first sub-image is captured when the image sensor or the light incoming towards the image sensor has not been shifted yet), and a second sub-image from amongst the two sub-images is captured when the image sensor or the light incoming towards the image sensor is shifted (i.e., moved) according to the one sub-pixel shift.

In other implementations, when two sub-pixel shifts are performed by the wobulator in one cycle of capturing sub-images, three sub-images are obtained. In other words, the three (different) sub-images are captured by the image sensor using the two sub-pixel shifts, wherein a first sub-image from amongst the three sub-images is captured when the image sensor is at its actual position, a second sub-image from amongst the three sub-images is captured when the image sensor or the light incoming towards the image sensor is shifted according to one of the two sub-pixel shifts, and a third sub-image from amongst the three sub-images is captured when the image sensor or the light incoming towards the image sensor is shifted according to another of the two sub-pixel shifts.

It will be appreciated that when capturing the first sub-image and the second sub-image, it is ensured that either the camera (or the image sensor) is capturing sub-images of a static real-world environment (i.e., only stationary objects or their parts are present in the real-world environment), or a change in a relative pose between the camera and a given object or its part present in the real-world environment is minimal/negligible. In this way, visual representation represented in the first sub-image and the second sub-image would be significantly similar to each other, and thus it would be advantageous to generate at least one of: the full-resolution colour image, the full-resolution polarisation image, the HDR image, upon processing the first sub-image and the second sub-image.

Optionally, for the first sub-image, the first image data is fully read out from the photo-sensitive surface of the image sensor. In particular, the at least one processor reads out (almost) each photo-sensitive cell on the photo-sensitive surface, i.e., (almost) all the photo-sensitive cells are read out, irrespective of whether their corresponding colour filters have or do not have the polarisation filters arranged on their respective optical paths. In other words, the first image data is (almost) fully sampled image data. Further, optionally, for the second sub-image, the second image data is selectively read out from the photo-sensitive surface. In particular, the at least one processor reads out those photo-sensitive cells that correspond to the remaining colour filters, and does not read out (namely, skips) those photo-sensitive cells that correspond to said colour filters. It will be appreciated that, for the first sub-image, sampling the first image data does not necessarily mean that all (i.e., 100 percent) of said photo-sensitive cells are read out. Thus, even when the aforesaid read out is performed only for a predefined percent (such as 95 percent or 99 percent) of said photo-sensitive cells, it should be considered as almost a full read out.

It may be noted that the terms "first" and "second" with respect to the first sub-image and the second sub-image are used to merely distinguish between two different sub-images. Usage of such terms in no way refer to an order in which these two different sub-images would be captured with the image sensor. In other words, it is not necessary that the first sub-image is always captured prior to capturing the second sub-image, or the second sub-image is always captured upon capturing the first sub-image. Therefore, it can be understood that the first sub-image may be captured before or after capturing the second sub-image.

Beneficially, a processing time for reading out the first image data (for the first sub-image) and selectively reading out the second image data (for the second sub-image) is considerably lesser, as compared to a processing time for reading out image data from each and every photo-sensitive cell for two images. In addition to this, reading out (and processing) the first image data and the second image data in the aforesaid manner, enables in achieving a high visual quality (for example, in terms of a native resolution, a high contrast, a realistic and accurate colour reproduction, low noise, and the like) in corresponding pixels of at least one image (that is generated upon processing the first sub-image and the second sub-image). It will be appreciated that such a selective read out of the second image data may facilitate in providing a high frame rate of images. This implementation has been also illustrated in conjunction with FIGS. 7A, 7B, and 7C, for sake of better understanding and clarity. The term "at least one image" encompasses at least one of: the full-resolution colour image, the full-resolution polarisation image, the HDR image. Optionally, the at least one processor is configured to process the first image data and the second image data together to generate the HDR image using the at least one neural network, wherein an input of the at least one neural network comprises at least the first image data and the second image data.

Optionally, when performing the sub-pixel shift, the image sensor and/or its corresponding optics is shifted by a step size (of the sub-pixel shift) along a direction that is parallel to a longitudinal axis of a given smallest repeating unit, when said colour filters and the remaining colour filters are arranged in a plurality of smallest repeating units in the CFA. A given smallest repeating unit comprises at least a first sub-unit and a second sub-unit, the first sub-unit comprising colour filters of the at least three different colours. In some implementations, the second sub-unit comprises colour filters of the at least three different colours. In other implementations, the second sub-unit comprises colour filters of at least three other colours that are different from the at least three different colours. Thus, the longitudinal axis may refer to an axis along which the first sub-unit and the second sub-unit of the given smallest repeating unit are arranged relative to each other. It will be appreciated that when the first sub-unit and the second sub-unit of the given smallest repeating unit are vertically arranged with respect to each other, the longitudinal axis lies in a vertical direction, and the sub-pixel shift would be performed in the vertical direction. On the other hand, when the first sub-unit and the second sub-unit of the given smallest repeating unit are horizontally arranged with respect to each other, the longitudinal axis lies in a horizontal direction, and the sub-pixel shift would be performed in the horizontal direction.

Optionally, a step size of the sub-pixel shift is Y pixels, wherein Y is an integer that lies in a range from 1 to Z, Z being equal to a number of pixels that lie in the first sub-unit along said longitudinal axis. Herein, the term "step size" refers to an amount or a distance by which the image sensor or the light incoming towards the image sensor is shifted/moved along the longitudinal axis, in order to perform the sub-pixel shift. The step size is defined in terms of a number of photo-sensitive cells. Lesser the step size of the sub-pixel shift between at least two sub-images, greater may be the image quality (for example, in terms of a resolution) of the at least one image that is generated upon processing the at least two sub-images, and vice versa. It will be appreciated that when the step size is Y pixels, wherein Y is the integer that lies in the range from 1 to Z, it means that the step size is an integer step size, wherein when performing the sub-pixel shift, the image sensor (or the light incoming towards the image sensor) is shifted along said longitudinal axis by an amount defined by a size of one or more (complete) pixels that lie in the first sub-unit along said longitudinal axis. The technical benefit of employing such an integer step size is that it facilitates in achieving an effect of demosaicking without having to perform an actual (i.e., a full and regular) demosaicking on the image data. This is because, a sub-pixel shift having a step size of Y pixels would facilitate in capturing two sub-images (namely, the first sub-image and the second sub-image) in which a same photo-sensitive cell of the image sensor receives light from neighbouring 3D points in the real-world environment. This allows for capturing more detailed visual information of a real-world scene in the at least one image (that is generated from the first sub-image and the second sub-image) as compared to when only one sub-image is captured. Therefore, only a minimal demosaicking may actually be required when processing the two or more sub-images. In this way, upon said processing, the at least one image would be accurately and realistically generated.

Optionally, when processing the first sub-image and the second sub-image, the at least one processor is configured to perform the interpolation and the demosaicking on the first image data and the second image data, to generate at least one of: the full-resolution colour image, the full-resolution polarisation image, the HDR image. The interpolation is performed because the second image data is obtained (by the at least one processor) as subsampled image data. Upon performing the interpolation, the demosaicking is performed to generate a set of complete colour information (for example, such as RGGB colour information or similar) for each pixel position. This is because when the sub-pixel shift is performed (which is relatively lesser as compared to a number of sub-pixel shifts used in the prior art), only partial (i.e., incomplete) colour information is obtained in the second sub-image for each pixel position. The interpolation and the demosaicking have been already discussed earlier in detail.

It will be appreciated that since the photo-sensitive cells that correspond to the colour filters on whose optical path the polarisation filters are arranged, are skipped when reading out the second image data, colour values of all the photo-sensitive cells would be obtained in the first image data and the second image data, due to the wobulation. Thus, it is likely that upon processing the first image data and the second image data, the full-resolution colour image would be highly realistically generated, as compared to generating the full-resolution polarisation image from same image data.

Furthermore, it will be appreciated that wobulation can also be used to generate a full-resolution polarisation image. In this regard, in another embodiment, the at least one processor is configured to:

when reading out the image data, obtain a third sub-image and a fourth sub-image from the image sensor, the image data comprising third image data and fourth image data corresponding to the third sub-image and the fourth sub-image, respectively, wherein when obtaining, the at least one processor is configured to:

for the third sub-image, read out the third image data from those photo-sensitive cells that correspond to the colour filters on whose optical path the polarisation filters are arranged and remaining colour filters on whose optical path the polarisation filters are not arranged; and for the fourth sub-image, read out the fourth image data from those photo-sensitive cells that correspond to the colour filters on whose optical path the polarisation filters are arranged, whilst skipping reading out from those photo-sensitive cells that correspond to the remaining colour filters on whose optical path the polarisation filters are not arranged, control the wobulator to perform a sub-pixel shift between the third sub-image and the fourth sub-image; and when processing the image data, process the third sub-image and the fourth sub-image, to generate a full-resolution polarisation image.

The full-resolution polarisation image so generated would be very high quality, because it is generated based on polarisation data that is captured for all the photo-sensitive cells.

Moreover, optionally, the polarisation mask further comprises opaque masks arranged beside at least a second predefined percent of the polarization filters and on the optical path of corresponding colour filters, wherein in the image sensor, the opaque masks block light from passing towards a first part of each photo-sensitive cell in a first set of photo-sensitive cells and a second part of each photo-sensitive cell in a second set of photo-sensitive cells, and wherein the at least one processor is configured to:

when reading out the image data, read out a plurality of image signals from the plurality of photo-sensitive cells;

select a plurality of pairs of photo-sensitive cells from the first set and the second set, each pair of photo-sensitive cells comprising one photo-sensitive cell from the first set and another photo-sensitive cell from the second set;

for a given pair of photo-sensitive cells comprising a first photo-sensitive cell from the first set and a second photo-sensitive cell from the second set, determine a phase difference between a first image signal read out from the first photo-sensitive cell and a second image signal read out from the second photo-sensitive cell; and adjust a focus distance of the imaging system, based on phase differences determined for the plurality of pairs of photo-sensitive cells.

Herein, the term "opaque mask" refers to a physical mask that is capable of blocking light from passing towards a corresponding part of a given photo-sensitive cell, said physical mask being arranged beside a given polarisation filter in the polarisation mask and on an optical path of a corresponding colour filter in the CFA. It will be appreciated that the opaque masks are only arranged beside only some of the polarisation filters (as defined by the second predefined percent), and need not be arranged beside all of the polarisation filters. In an example, the polarisation filters may be arranged on the optical path of 50 percent (i.e., half) of the colour filters in the CFA, and the opaque masks may be arranged beside 50 percent (i.e., half) of such polarisation filters. In other words, the opaque masks may be arranged on the optical path of only 25 percent of the photo-sensitive cells. Therefore, only 25 percent of the photo-sensitive cells would be utilised for phase-detection auto focus (PDAF) (according to the aforementioned processing steps). It is to be noted that such a percentage of the photo-sensitive cells employed for the PDAF is significantly greater, as compared to a typical range, for example, from 5 percent to 10 percent, in conventional PDAF-based image sensors. Opaque masks have been also illustrated in conjunction with FIG. 4, for sake of better understanding and clarity.

It will be appreciated that in some cases, the first part (namely, portion) of each photo-sensitive cell in the first set is one of a left part and a right part of each photo-sensitive cell, whereas the second part of each photo-sensitive cell in the second set is another of the left part and the right part of each photo-sensitive cell. In other cases, the first part of each photo-sensitive cell in the first set is one of a top part and a bottom part of each photo-sensitive cell, whereas the second part of each photo-sensitive cell in the second set is another of the top part and the bottom part of each photo-sensitive cell. In other words, the first part and the second part are opposite parts.

The plurality of image signals (as described earlier) are optionally read out (namely, sampled) by the at least one processor from the plurality of photo-sensitive cells, for example, in a line-by-line (namely, sequential) manner. The plurality of image signals are read out in order to determine which photo-sensitive cells are not able to receive the light (namely, photons) at their respective first parts, and which photo-sensitive cells are not able to receive the light at their respective second parts.

Further, optionally, when selecting the plurality of pairs of photo-sensitive cells, the at least one processor is configured to select the first photo-sensitive cell (from the first set) and the second photo-sensitive cell (from the second) such that the first photo-sensitive cell and the second photo-sensitive cell correspond to colour filters of two different colours, said colour filters being the ones on whose optical path both opaque masks and polarisation filters of a same type are arranged. The aforesaid selection could be a random selection. Alternatively, optionally, when selecting the plurality of pairs of photo-sensitive cells, the at least one processor is configured to select the first photo-sensitive cell and the second photo-sensitive cell such that both the first photo-sensitive cell and the second photo-sensitive cell correspond to colour filters of a same colour, said colour filters being the ones on whose optical path both opaque masks and polarisation filters of a same type are arranged. The at least one processor may select the plurality of pairs of photo-sensitive cells in a dynamic manner, for example, based on a lighting condition in the real-world environment.

For the given pair, the phase difference is determined between the first image signal read out from the first photo-sensitive cell whose first part (for example, a left part) does not receive the light, and the second image signal read out from the second photo-sensitive cell whose second part (for example, a left part) does not receive the light. Said phase difference can be easily determined from the first image signal and the second image signal. Determining the phase difference from image signals is well-known in the art. By analysing the phase differences for the plurality of pairs, the at least one processor could determine whether an object or its portion in a real-world scene of the real-world environment is in-focus or is out-of-focus (namely, blurred), and when said object or its portion is determined to be out-offocus, the focus distance of the imaging system is adjusted accordingly. It will be appreciated that when adjusting the focus distance of the imaging system, the at least one processor is configured to utilise a predefined correlation between the phase differences and the focus distance. In an example, the focus distance may be adjusted by adjusting an optical focus of the camera in a step-wise manner. A range of the focus distance is a range of optical depths at which the camera focuses within the real-world scene. Different cameras have different ranges of focus distance for different focus steps. When a given focus step is employed for focusing the camera, the optical focus of the camera is adjusted to lie at a given optical depth. A total number of focus steps available for focusing are specific to a camera lens/optics of the camera. Typically, a number of focus steps is higher at smaller optical depths (namely, corresponding to nearby objects), as compared to larger optical depths (namely, corresponding to far-away objects). The number of focus steps could also be defined by a circle of confusion, and is well-known in the art. Techniques (for example, a PDAF technique) for adjusting the focus distance based on the phase differences are well-known in the art.

The present disclosure also relates to the method as described above. Various embodiments and variants disclosed above, with respect to the aforementioned imaging system, apply mutatis mutandis to the method.

Optionally, in the method, the step of processing the image data comprises performing interpolation and demosaicking on a part of the image data that is read out from those photo-sensitive cells that correspond to remaining colour filters on whose optical path the polarisation filters are not arranged, to generate the full-resolution colour image. Additionally, optionally, in the method, the interpolation and the demosaicking are performed on said part of the image data, based on another part of the image data that is read out from those photo-sensitive cells that correspond to the colour filters on whose optical path the polarisation filters are arranged.

Optionally, in the method, the step of processing the image data comprises performing interpolation and demosaicking on a part of the image data that is read out from those photo-sensitive cells that correspond to remaining colour filters on whose optical path the polarisation filters are not arranged, based on another part of the image data that is read out from those photo-sensitive cells that correspond to the colour filters on whose optical path the polarisation filters are arranged, using an HDR imaging technique, to generate the HDR image.

Optionally, in the method, the step of processing the image data comprises performing interpolation and demosaicking on said another part of the image data that is read out from those photo-sensitive cells that correspond to the colour filters on whose optical path the polarisation filters are arranged, to generate the full-resolution polarisation image. Additionally, optionally, in the method, the interpolation and the demosaicking are performed on said another part of the image data, based on said part of the image data that is read out from those photo-sensitive cells that correspond to remaining colour filters on whose optical path the polarisation filters are not arranged.

Optionally, in the method, the interpolation and the demosaicking are performed using at least one neural network.

Optionally, in the method, the step of reading out the image data comprises obtaining a first sub-image and a second sub-image from the image sensor, the image data comprising first image data and second image data corresponding to the first sub-image and the second sub-image, respectively, wherein the step of obtaining comprises:

for the first sub-image, reading out the first image data from those photo-sensitive cells that correspond to the colour filters on whose optical path the polarisation filters are arranged and remaining colour filters on whose optical path the polarisation filters are not arranged; and for the second sub-image, reading out the second image data from those photo-sensitive cells that correspond to the remaining colour filters on whose optical path the polarisation filters are not arranged, whilst skipping reading out from those photo-sensitive cells that correspond to the colour filters on whose optical path the polarisation filters are arranged, wherein the method further comprises controlling a wobulator to perform a sub-pixel shift between the first sub-image and the second sub-image, further wherein the step of processing the image data comprises processing the first sub-image and the second sub-image, to generate at least one of: the full-resolution colour image, the full-resolution polarisation image, the HDR image.

Optionally, in the method, the step of reading out the image data comprises obtaining a third sub-image and a fourth sub-image from the image sensor, the image data comprising third image data and fourth image data corresponding to the third sub-image and the fourth sub-image, respectively, wherein the step of obtaining comprises:

for the third sub-image, reading out the third image data from those photo-sensitive cells that correspond to the colour filters on whose optical path the polarisation filters are arranged and remaining colour filters on whose optical path the polarisation filters are not arranged; and for the fourth sub-image, reading out the fourth image data from those photo-sensitive cells that correspond to the colour filters on whose optical path the polarisation filters are arranged, whilst skipping reading out from those photo-sensitive cells that correspond to the remaining colour filters on whose optical path the polarisation filters are not arranged, wherein the method further comprises controlling a wobulator to perform a sub-pixel shift between the third sub-image and the fourth sub-image, further wherein the step of processing the image data comprises processing the third sub-image and the fourth sub-image, to generate a full-resolution polarisation image.

Optionally, the polarisation mask further comprises opaque masks arranged beside at least a second predefined percent of the polarization filters and on the optical path of corresponding colour filters, wherein in the image sensor, the opaque masks block light from passing towards a first part of each photo-sensitive cell in a first set of photo-sensitive cells and a second part of each photo-sensitive cell in a second set of photo-sensitive cells, wherein the step of reading out the image data comprises reading out a plurality of image signals from the plurality of photo-sensitive cells, and wherein the method further comprises:

selecting a plurality of pairs of photo-sensitive cells from the first set and the second set, each pair of photo-sensitive cells comprising one photo-sensitive cell from the first set and another photo-sensitive cell from the second set;

for a given pair of photo-sensitive cells comprising a first photo-sensitive cell from the first set and a second photo-sensitive cell from the second set, determining a phase difference between a first image signal read out from the first photo-sensitive cell and a second image signal read out from the second photo-sensitive cell; and adjusting a focus distance of the imaging system, based on phase differences determined for the plurality of pairs of photo-sensitive cells.

DETAILED DESCRIPTION OF THE DRAWINGS

Referring to FIG. 1, illustrated is a block diagram of an architecture of an imaging system 100 incorporating a partial polarisation mask for high-dynamic range (HDR) imaging, in accordance with an embodiment of the present disclosure. The imaging system 100 comprises an image sensor 102 and at least one processor (depicted as a processor 104). The image sensor 102 comprises a plurality of photo-sensitive cells 106, a colour filter array 108, and a polarisation mask 110. Optionally, the imaging system 100 further comprises a wobulator 112. The processor 104 is communicably coupled to the image sensor 102 and, optionally, to the wobulator 112. The processor 104 is configured to perform various operations, as described earlier with respect to the aforementioned first aspect.

It may be understood by a person skilled in the art that FIG. 1 includes a simplified architecture of the imaging system 100, for sake of clarity, which should not unduly limit the scope of the claims herein. It is to be understood that the specific implementation of the imaging system 100 is provided as an example and is not to be construed as limiting it to specific numbers or types of image sensors, processors, photo-sensitive cells, colour filter arrays, wobulators, and polarisation masks. The person skilled in the art will recognize many variations, alternatives, and modifications of embodiments of the present disclosure.

Figure 2:
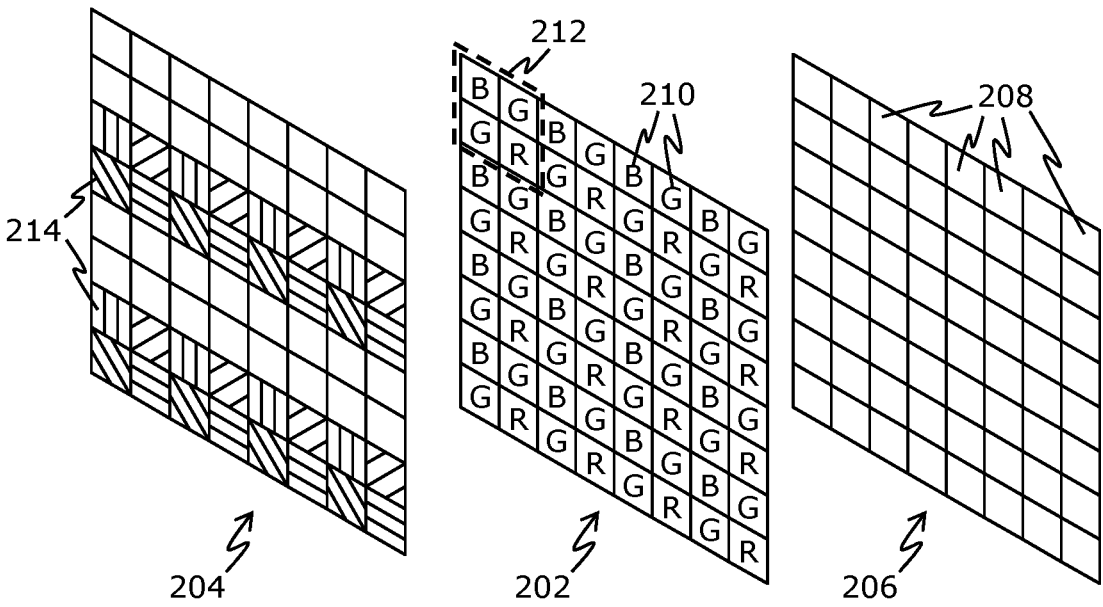
FIG. 2 illustrates a simplified example of how a colour filter array (CFA) and a polarisation mask are arranged in front of a photo-sensitive surface of an image sensor, in accordance with an embodiment of the present disclosure.

Referring to FIG. 2, illustrated is a simplified perspective view of how a colour filter array (CFA) 202 and a polarisation mask 204 are arranged in an image sensor, in accordance with an embodiment of the present disclosure. For sake of simplicity and clarity, a portion of the CFA 202 is shown to correspond to a portion of a photo-sensitive surface 206 of the image sensor. Said portion of the photo-sensitive surface 206 comprises 64 photo-sensitive cells (for example, depicted as some photo-sensitive cells 208) arranged in an 8×8 grid, and colour filters 210 in the shown portion of the CFA 202 are arranged in front of respective ones of the 64 photo-sensitive cells. In the CFA 202, "B" refers to a blue colour filter, "G" refers to a green colour filter, and "R" refers to a red colour filter. The shown portion of the CFA 202 comprises 64 colour filters arranged in an 8×8 array, wherein a given smallest repeating unit 212 (depicted as a 2×2 array of colour filters, using a dashed line box) is repeated throughout the CFA 202, and wherein the given smallest repeating unit 212 comprises two green colour filters, one red colour filter, and one blue colour filter. It will be appreciated that in some implementations, a cyan colour filter, a magenta colour filter, and a yellow colour filter could also be employed instead of employing the blue colour filter, the green colour filter, and the red colour filter. It will also be appreciated that a photo-sensitive surface of a typical image sensor has millions of photo-sensitive cells (namely, pixels). A portion of the polarisation mask 204 is shown to be arranged in front of said portion of the CFA 202, wherein polarisation filters 214 in said portion of the polarisation mask 204 are arranged on an optical path of 32 colour filters (namely, 50 percent of the 64 colour filters) of the CFA 202. As shown, the polarisation filters 214 are arranged in a row-wise manner.

It will be appreciated that in these drawings, in a given polarisation mask, a horizontal stripe pattern ("—") is used to depict a polarisation filter that only allows horizontally-polarized light (namely, light with a 0-degree polarization angle) to pass therethrough, and that hereinafter referred to as "horizontal polarisation filter", for sake of convenience only. A vertical stripe pattern ("|") is used to depict a polarisation filter that only allows vertically-polarized light (namely, light with a 90-degrees polarization angle) to pass therethrough, and that hereinafter referred to as "vertical polarisation filter", for sake of convenience only. A right-diagonal stripe pattern ("/") is used to depict a polarisation filter that only allows light with a 45-degrees polarization angle to pass therethrough, and that hereinafter referred to as "45-degrees polarisation filter", for sake of convenience only. A left-diagonal stripe pattern ("\") is used to depict a polarisation filter that only allows light with a 135-degrees polarization angle to pass therethrough, and that hereinafter referred to as "135-degrees polarisation filter", for sake of convenience only. This has been depicted in FIG. 2 and will be depicted in some subsequent figures (such as FIGS. 3, 4, 7A, and 7B).

With reference to FIG. 2, eight 135-degrees polarisation filters are shown to be arranged on an optical path of eight green colour filters. Eight 45-degrees polarisation filters are shown to be arranged on an optical path of eight green colour filters. Eight horizontal polarisation filters are shown to be arranged on an optical path of another eight red colour filters. Eight vertical polarisation filters are shown to be arranged on an optical path of eight blue colour filters. It will be appreciated that FIG. 2 depicts only one example way of arranging polarisation filters in the given polarisation mask. There could also be various other ways of arranging the polarisation filters in the given polarisation mask, for example, as shown in subsequent FIGS. 3, 4, 7A, and 7B.

Figure 3:
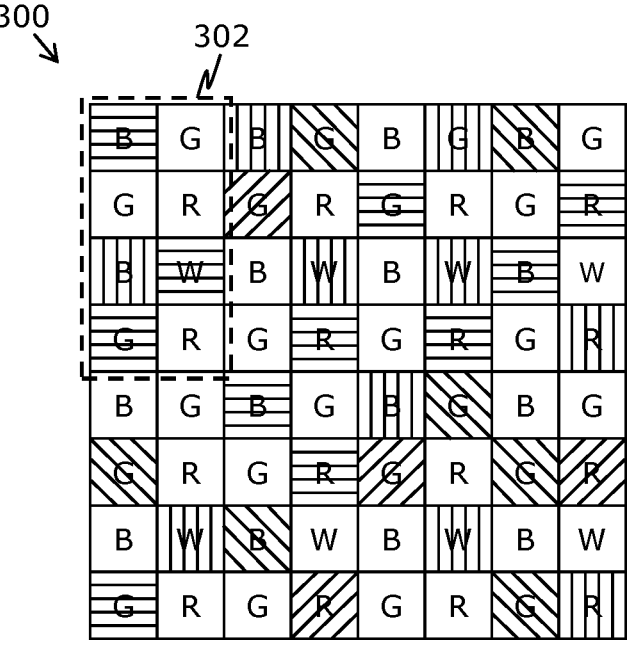
FIG. 3 illustrates a simplified example of a polarisation mask integrated with a colour filter array, in accordance with an embodiment of the present disclosure.

Referring to FIG. 3, illustrated is a simplified example of a polarisation mask integrated with a colour filter array (CFA), in accordance with an embodiment of the present disclosure. Herein, "B" refers to a blue colour filter, "G" refers to a green colour filter, "R" refers to a red colour filter, and "W" refers to a white or near-white colour filter. The white or near-white colour filter allows to pass through at least three wavelengths corresponding to respective ones of at least a green colour, a red colour, and a blue colour, simultaneously. As shown, a portion 300 of the CFA comprises 64 colour filters arranged in an 8×8 array, wherein a given smallest repeating unit 302 (depicted as a 2×4 array of colour filters, using a dashed line box) is repeated throughout the CFA, and wherein the given smallest repeating unit 302 comprises three green colour filters, two red colour filters, two blue colour filters, one white or near-white colour filter. A portion of the polarisation mask comprising 32 polarisation filters is shown to be integrated with said portion 300 of the CFA, wherein the 32 polarisation filters are randomly arranged on an optical path of respective ones of 32 colour filters (namely, 50 percent of the 64 colour filters) in said portion 300 of the CFA. As shown, the 32 polarisation filters are arranged in a random manner. In particular, seven 135-degrees polarisation filters are shown to be arranged on an optical path of 5 green colour filters and 2 blue colour filters. Four 45-degrees polarisation filters are shown to be arranged on an optical path of 2 green colour filters and 2 red colour filters. Eleven horizontal polarisation filters are shown to be arranged on an optical path of 3 green colour filters, 2 blue colour filters, 4 red colour filters, and 1 white or near-white colour filter. Ten vertical polarisation filters are shown to be arranged on an optical path of 1 green colour filter, 3 blue colour filters, 3 red colour filters, and 4 white or near-white colour filter.

Figure 4:
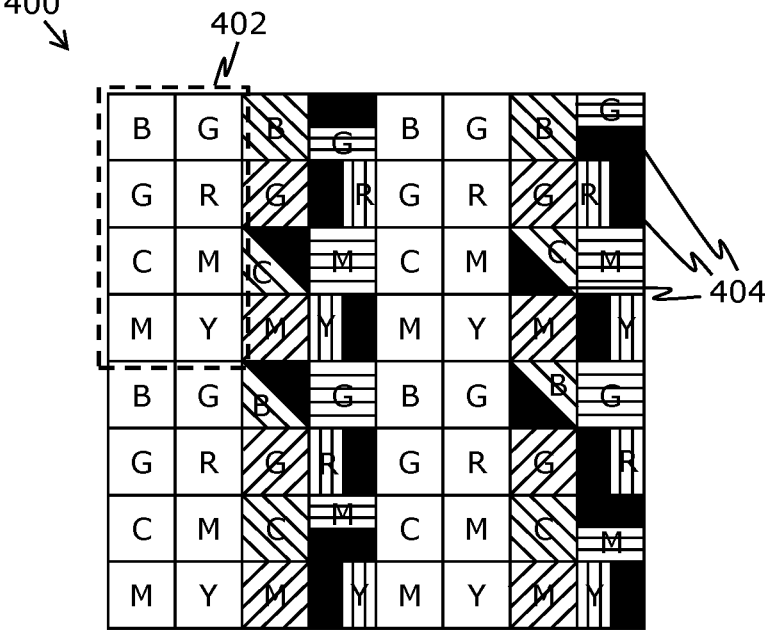
FIG. 4 illustrates a simplified example of a polarisation mask comprising opaque masks and being integrated with a colour filter array, in accordance with an embodiment of the present disclosure.

Referring to FIG. 4, illustrated is a simplified example of a polarisation mask comprising opaque masks and being integrated with a colour filter array, in accordance with an embodiment of the present disclosure. Herein, "B" refers to a blue colour filter, "G" refers to a green colour filter, "R" refers to a red colour filter, "C" refers to a cyan colour filter, "M" refers to a magenta colour filter, and "Y" refers to a yellow colour filter. As shown, a portion 400 of the CFA comprises 64 colour filters arranged in an 8×8 array, wherein a given smallest repeating unit 402 (depicted as a 2×4 array of colour filters, using a dashed line box) is repeated throughout the portion 400 of the CFA, and wherein the given smallest repeating unit 402 comprises two green colour filters, one red colour filter, one blue colour filter, two magenta colour filters, one cyan colour filter, and one yellow colour filter.

A portion of the polarisation mask comprising 32 polarisation filters is shown to be integrated with said portion 400, wherein the 32 polarisation filters are arranged on an optical path of respective ones of 32 colour filters (namely, 50 percent of the 64 colour filters) of said portion 400 of the CFA. In particular, eight 135-degrees polarisation filters are shown to be arranged on an optical path of 4 green colour filters and 4 cyan colour filters. Eight 45-degrees polarisation filters are shown to be arranged on an optical path of 4 green colour filters and 4 magenta colour filters. Eight horizontal polarisation filters are shown to be arranged on an optical path of 4 green colour filters and 4 magenta colour filters. Eight vertical polarisation filters are shown to be arranged on an optical path of 4 red colour filters and 4 yellow colour filters.

The shown portion of the polarisation mask further comprises 16 opaque masks 404 (wherein some opaque masks are depicted using thick black rectangular stripes, while other opaque masks are depicted using thick black triangular stripes) that are arranged beside 16 polarization filters (namely, 50 percent of the 32 polarisation filters), and on the optical path of respective ones of 16 corresponding colour filters. A given opaque mask blocks light from passing towards a given part of a given photo-sensitive cell that corresponds to a given colour filter on whose optical path a given polarisation filter is arranged. In particular, 2 opaque masks are shown to block the light from passing towards top parts of a photo-sensitive cell corresponding to a horizontal polarisation filter and a green colour filter, and a photo-sensitive cell corresponding to a horizontal polarisation filter and a magenta colour filter, respectively. 2 opaque masks are shown to block the light from passing towards bottom parts of a photo-sensitive cell corresponding to a horizontal polarisation filter and a magenta colour filter, and a photo-sensitive cell corresponding to a horizontal polarisation filter and a green colour filter, respectively. 4 opaque masks are shown to block the light from passing towards left parts of two photo-sensitive cells corresponding to two vertical polarisation filter and two red colour filters, and two photo-sensitive cells corresponding to two vertical polarisation filters and two yellow colour filters, respectively. 4 opaque masks are shown to block the light from passing towards right parts of two photo-sensitive cells corresponding to two vertical polarisation filter and two red colour filters, and two photo-sensitive cells corresponding to two vertical polarisation filters and two yellow colour filters, respectively. 2 opaque masks are shown to block the light from passing towards top-right parts of two photo-sensitive cells corresponding to a 135-degrees polarisation filter and a cyan colour filter, and a photo-sensitive cell corresponding to a 135-degrees polarisation filter and a blue colour filter, respectively. 2 opaque masks are shown to block the light from passing towards bottom-left parts of two photo-sensitive cells corresponding to a 135-degrees polarisation filter and a cyan colour filter, and a photo-sensitive cell corresponding to a 135-degrees polarisation filter and a blue colour filter, respectively.

Figure 5:
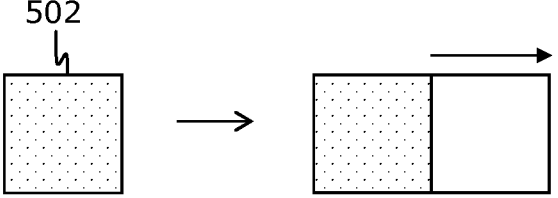
FIG. 5 illustrates an exemplary step size of a sub-pixel shift employed for capturing a sub-image, in accordance with an embodiment of the present disclosure.

Referring to FIG. 5, illustrated is an exemplary step size of a sub-pixel shift employed for capturing a sub-image, in accordance with an embodiment of the present disclosure. For sake of simplicity and better understanding, the sub-pixel shift of only a single pixel 502 (depicted using a dotted pattern) of an image sensor is shown. As shown, the step size of said sub-pixel shift (whose direction is depicted using a solid horizontal arrow) is one complete pixel, i.e., the single pixel 502 is shown to be shifted horizontally rightwards by an amount defined by the (full) size of the single pixel 502. Similarly, as an example, when the step size is two pixels, the single pixel 502 would be shifted horizontally rightwards by an amount defined by twice of the size of the single pixel 502.

Figure 6A:
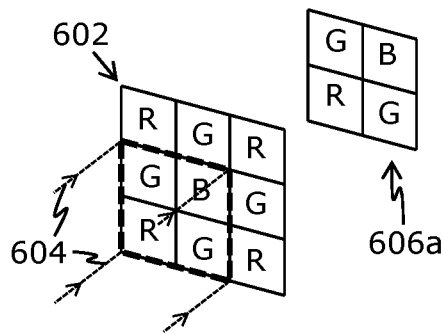
FIGS. 6A and 6B illustrate how sub-pixel shifting is performed when capturing sub-images with an image sensor, in accordance with an embodiment of the present disclosure.
Figure 6B:
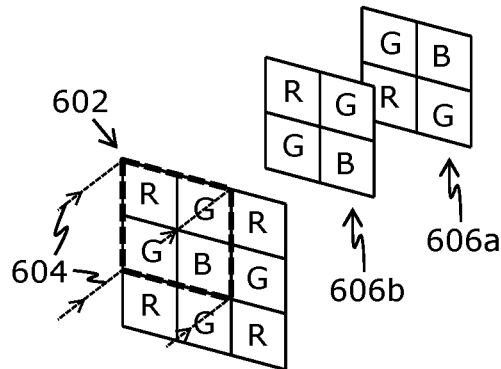

Referring to FIGS. 6A and 6B, illustrated is how sub-pixel shifting is performed when capturing sub-images with an image sensor 602, in accordance with an embodiment of the present disclosure. For sake of simplicity and better understanding, sub-pixel shifting of only a portion (depicted using a dashed box) of the image sensor 602 is shown. The image sensor 602 comprises a standard Bayer colour filter array (CFA) in which a given smallest repeating 2×2 array of pixels has two green colour pixels (depicted using a letter "G"), one red colour pixel (depicted using a letter "R"), and one blue colour pixel (depicted using a letter "B"). As shown, one sub-pixel shift is performed by a wobulator for capturing two sub-images. For capturing the two sub-images, light 604 incoming from a real-world scene of a real-world environment is detected by the portion of the image sensor 602. With reference to FIG. 6A, a first sub-image 606a from amongst the two sub-images is captured when the image sensor 602 is at its existing (i.e., original) position. With reference to FIG. 6B, a second sub-image 606b from amongst the two sub-images is captured when the image sensor 602 (or the light 604) is shifted by a step size of one complete pixel in a vertically downward direction according to the one sub-pixel shift. It is to be noted that FIGS. 6A and 6B collectively represent a general concept of sub-pixel shifting (namely, wobulation). Pursuant to embodiments of the present disclosure, the first sub-image 606a and/or the second sub-image 606b may comprise subsampled image data of a part of a field of view of the image sensor 602, wherein the subsampled image data may be subsampled according to a subsampling pattern.

Figure 7A:
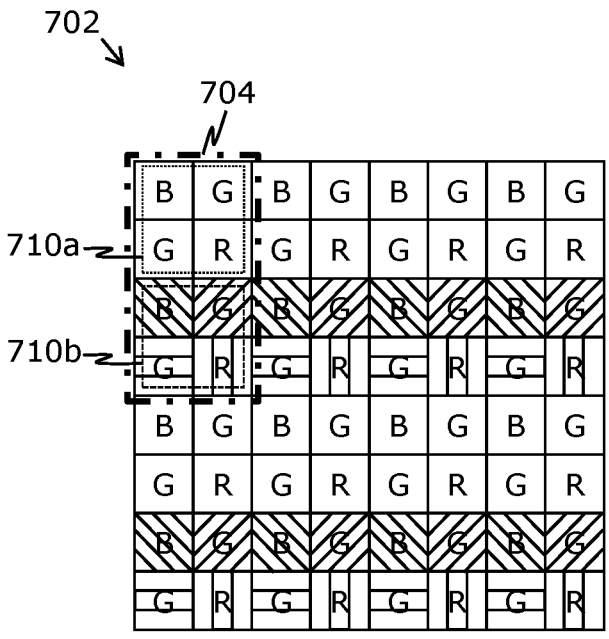
Figure 7B:
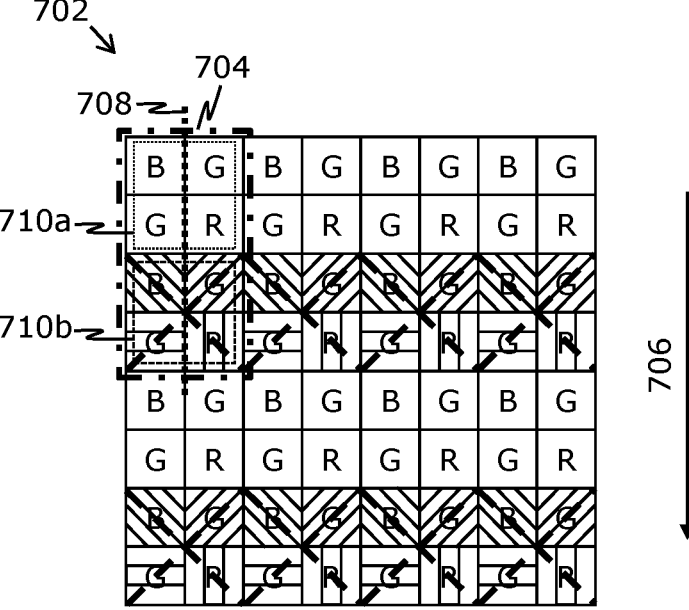
Figure 7C:
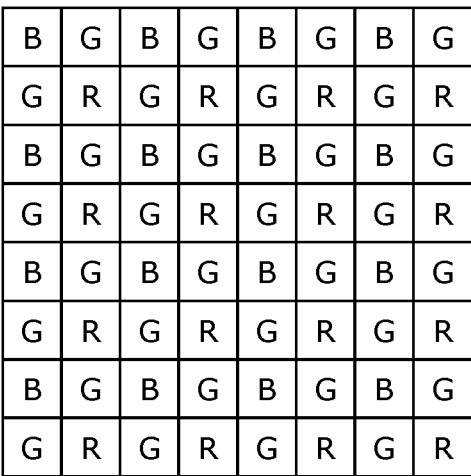
FIG. 7C illustrates resulting image data corresponding to the second sub-image upon performing sub-pixel shifting, in accordance with an embodiment of the present disclosure.

Referring to FIGS. 7A and 7B, illustrated is how first image data and second image data are read out from a portion of a photo-sensitive surface of an image sensor for capturing a first sub-image and a second sub-image, respectively, while FIG. 7C illustrates resulting image data corresponding to the second sub-image upon performing sub-pixel shifting, in accordance with an embodiment of the present disclosure. With reference to FIGS. 7A-7C, "B" refers to a blue colour filter, "G" refers to a green colour filter, and "R" refers to a red colour filter. It will be appreciated that in some implementations, a cyan colour filter, a magenta colour filter, and a yellow colour filter could also be employed instead of employing the blue colour filter, the green colour filter, and the red colour filter. Furthermore, the terms "first" and "second" with respect to the first sub-image and the second sub-image are used to merely distinguish between two different sub-images, and in no way refer to an order in which these two different sub-images would be captured with the image sensor. Therefore, it can be understood that the first sub-image may be captured before or after capturing the second sub-image.

With reference to FIG. 7A, there is shown how the first image data is read out from a portion of the photo-sensitive surface 702 for capturing the first sub-image. With reference to FIG. 7B, there is shown how the second image data is read out from the portion of the photo-sensitive surface 702 for capturing the second sub-image.

With reference to FIGS. 7A and 7B, for sake of simplicity and clarity, said portion is shown to comprise 64 photo-sensitive cells arranged in an 8×8 grid. It will be appreciated that a photo-sensitive surface of a typical image sensor has millions of photo-sensitive cells (namely, pixels). The image sensor comprises a colour filter array (CFA) arranged in front of photo-sensitive cells of the photo-sensitive surface 702. As shown, the CFA comprises 8 smallest repeating units being arranged in rows and columns, wherein a given smallest repeating unit 704 (depicted as a 2×4 array of colour filters, using a dash-dot line box) comprises four green colour filters, two red colour filters, and two blue colour filters. Thus, the CFA comprises 64 colour filters arranged in front of respective ones of the 64 photo-sensitive cells. The image sensor comprises a polarisation mask, wherein the polarisation mask comprises 32 polarisation filters arranged on an optical path of 32 colour filters (i.e., 50 percent of the 64 colour filters). Eight 135-degrees polarisation filters are shown to be arranged on an optical path of eight blue colour filters. Eight 45-degrees polarisation filters are shown to be arranged on an optical path of eight green colour filters. Eight horizontal polarisation filters are shown to be arranged on an optical path of another eight green colour filters. Eight vertical polarisation filters are shown to be arranged on an optical path of eight red colour filters. Thus, remaining 32 colour filters of the CFA do not have any polarisation filter arranged on their respective optical paths.

With reference to FIG. 7A, for the first sub-image, the first image data is read out from 64 photo-sensitive cells that correspond to the 32 colour filters on whose optical path the 32 polarisation filters are arranged and the remaining 32 colour filters on whose optical path polarisation filters are not arranged. In other words, the first image data is fully sampled. With reference to FIG. 7B, for the second sub-image, the second image data is read out from 32 photo-sensitive cells that correspond to the 32 remaining colour filters on whose optical path polarisation filters are not arranged. The second image data is not read out (namely, is skipped) from remaining 32 photo-sensitive cells (crossed out as dashed 'X's) that correspond to the 32 colour filters on whose optical path the 32 polarisation filters are arranged.

With reference to FIGS. 7A and 7B, the first sub-image and the second sub-image are captured by performing only one sub-pixel shift. In this regard, the second sub-image is captured when the image sensor (or light incoming towards the image sensor) is shifted by a step size of two complete pixels in a downward direction 706 (i.e., along a longitudinal axis 708 of the given smallest repeating unit 704) according to the one sub-pixel shift. Such a sub-pixel shifting is performed by a wobulator. It will be appreciated that when the polarisation mask and the CFA are considered together, the given smallest repeating unit 704 comprises a first sub-unit 710*a* (depicted using a dotted box) and a second sub-unit 710*b* (depicted using a dashed box), and the sub-pixel shifting is performed along the longitudinal axis 708 of the given smallest repeating unit 704. As shown, the first sub-unit 710*a* and the second sub-unit 710*b* are vertically arranged with respect to each other. Therefore, the longitudinal axis 708 lies along a vertical direction, and the sub-pixel shifting is performed in the vertical direction (in this particular case, in a vertically-downward direction 706). Each of the first sub-unit 710*a* and the second sub-unit 710*b* comprises two green colour filters, one red colour filter, and one blue colour filter. With reference to FIG. 7C, due to the sub-pixel shifting as shown in FIG. 7B, (colour) image data corresponding to all the 64 photo-sensitive cells is captured.

FIGS. 2, 3, 4, 5, 6A-6B, and 7A-7C are merely examples, which should not unduly limit the scope of the claims herein. The person skilled in the art will recognize many variations, alternatives, and modifications of embodiments of the present disclosure.

Figure 8:
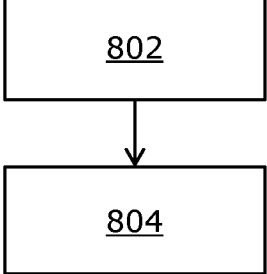
FIG. 8 illustrates steps of a method for high-dynamic range (HDR) imaging using a partial polarisation mask, in accordance with an embodiment of the present disclosure.

Referring to FIG. 8, illustrated are steps of a method for high-dynamic range (HDR) imaging using a partial polarisation mask, in accordance with an embodiment of the present disclosure. At step 802, image data is read out from an image sensor, wherein the image sensor comprises: a plurality of photo-sensitive cells arranged on a photo-sensitive surface of the image sensor; a colour filter array comprising colour filters of at least three different colours; and a polarisation mask comprising polarisation filters arranged on an optical path of at most a first predefined percent of the colour filters. At step 804, the image data is processed to generate at least one of: a full-resolution colour image, a full-resolution polarisation image, a high-dynamic range (HDR) image.

The aforementioned steps are only illustrative and other alternatives can also be provided where one or more steps are added, one or more steps are removed, or one or more steps are provided in a different sequence without departing from the scope of the claims.

The invention claimed is:

1. An imaging system comprising:

an image sensor comprising:

a plurality of photo-sensitive cells arranged on a photo-sensitive surface of the image sensor;

a colour filter array comprising colour filters of at least three different colours; and a polarisation mask comprising polarisation filters arranged on an optical path of at most a first predefined percent of the colour filters; and at least one processor configured to:

read out image data from the image sensor; and process the image data to generate at least one of: a full-resolution colour image, a full-resolution polarisation image, a high-dynamic range (HDR) image; and a wobulator configured to perform sub-pixel shifts when capturing sub-images with the image sensor, wherein the at least one processor is further configured to:

when reading out the image data, obtain a first sub-image and a second sub-image from the image sensor, the image data comprising first image data and second image data corresponding to the first sub-image and the second sub-image, respectively, wherein when obtaining, the at least one processor is configured to:

for the first sub-image, read out the first image data from those photo-sensitive cells that correspond to the colour filters on whose optical path the polarisation filters are arranged and remaining colour filters on whose optical path the polarisation filters are not arranged; and for the second sub-image, read out the second image data from those photo-sensitive cells that correspond to the remaining colour filters on whose optical path the polarisation filters are not arranged, whilst skipping reading out from those photo-sensitive cells that correspond to the colour filters on whose optical path the polarisation filters are arranged;

control the wobulator to perform a sub-pixel shift between the first sub-image and the second sub-image; and when processing the image data, process the first sub-image and the second sub-image, to generate at least one of: the full-resolution colour image, the full-resolution polarisation image, the HDR image.

2. The imaging system of claim 1, wherein when processing the image data, the at least one processor is configured to perform interpolation and demosaicking on a part of the image data that is read out from those photo-sensitive cells that correspond to remaining colour filters on whose optical path the polarisation filters are not arranged, to generate the full-resolution colour image.

3. The imaging system of claim 2, wherein the interpolation and the demosaicking are performed on said part of the image data, based on another part of the image data that is read out from those photo-sensitive cells that correspond to the colour filters on whose optical path the polarisation filters are arranged.

4. The imaging system of claim 1, wherein when processing the image data, the at least one processor is configured to perform interpolation and demosaicking on a part of the image data that is read out from those photo-sensitive cells that correspond to remaining colour filters on whose optical path the polarisation filters are not arranged, based on another part of the image data that is read out from those photo-sensitive cells that correspond to the colour filters on whose optical path the polarisation filters are arranged, using an HDR imaging technique, to generate the HDR image.

5. The imaging system of claim 1, wherein when processing the image data, the at least one processor is configured to perform interpolation and demosaicking on another part of the image data that is read out from those photo-sensitive cells that correspond to the colour filters on whose optical path the polarisation filters are arranged, to generate the full-resolution polarisation image.

6. The imaging system of claim 5, wherein the interpolation and the demosaicking are performed on said another part of the image data, based on a part of the image data that is read out from those photo-sensitive cells that correspond to remaining colour filters on whose optical path the polarisation filters are not arranged.

7. The imaging system of claim 2, wherein the interpolation and the demosaicking are performed using at least one neural network.

8. The imaging system of claim 1, wherein the polarisation mask further comprises opaque masks arranged beside at least a second predefined percent of the polarization filters and on the optical path of corresponding colour filters, wherein in the image sensor, the opaque masks block light from passing towards a first part of each photo-sensitive cell in a first set of photo-sensitive cells and a second part of each photo-sensitive cell in a second set of photo-sensitive cells, and wherein the at least one processor is configured to:

when reading out the image data, read out a plurality of image signals from the plurality of photo-sensitive cells;

select a plurality of pairs of photo-sensitive cells from the first set and the second set, each pair of photo-sensitive cells comprising one photo-sensitive cell from the first set and another photo-sensitive cell from the second set;

for a given pair of photo-sensitive cells comprising a first photo-sensitive cell from the first set and a second photo-sensitive cell from the second set, determine a phase difference between a first image signal read out from the first photo-sensitive cell and a second image signal read out from the second photo-sensitive cell; and adjust a focus distance of the imaging system, based on phase differences determined for the plurality of pairs of photo-sensitive cells.

9. A method comprising:

reading out image data from an image sensor, wherein the image sensor comprises: a plurality of photo-sensitive cells arranged on a photo-sensitive surface of the image sensor; a colour filter array comprising colour filters of at least three different colours; and a polarisation mask comprising polarisation filters arranged on an optical path of at most a first predefined percent of the colour filters;

wherein reading out the image data comprises obtaining a first sub-image and a second sub-image from the image sensor, the image data comprising first image data and second image data corresponding to the first sub-image and the second sub-image, respectively, by:

for the first sub-image, reading out the first image data from those photo-sensitive cells that correspond to the colour filters on whose optical path the polarisation filters are arranged and remaining colour filters on whose optical path the polarisation filters are not arranged; and for the second sub-image, reading out the second image data from those photo-sensitive cells that correspond to the remaining colour filters on whose optical path the polarisation filters are not arranged, whilst skipping reading out from those photo-sensitive cells that correspond to the colour filters on whose optical path the polarisation filters are arranged, wherein the method further comprises controlling a wobulator to perform a sub-pixel shift between the first sub-image and the second sub-image, further wherein the step of processing the image data comprises processing the first sub-image and the second sub-image, to generate at least one of: the full-resolution colour image, the full-resolution polarisation image, the HDR image and processing the image data to generate at least one of: a full-resolution colour image, a full-resolution polarisation image, a high-dynamic range (HDR) image by performing interpolation and demosaicking on a part of the image data that is read out from those photo-sensitive cells that correspond to remaining colour filters on whose optical path the polarisation filters are not arranged, to generate the full-resolution colour image.

10. The method of claim 9, wherein the step of processing the image data comprises performing interpolation and demosaicking on a part of the image data that is read out from those photo-sensitive cells that correspond to remaining colour filters on whose optical path the polarisation filters are not arranged, based on another part of the image data that is read out from those photo-sensitive cells that correspond to the colour filters on whose optical path the polarisation filters are arranged, using an HDR imaging technique, to generate the HDR image.

11. The method of claim 9, wherein the step of processing the image data comprises performing interpolation and demosaicking on another part of the image data that is read out from those photo-sensitive cells that correspond to the colour filters on whose optical path the polarisation filters are arranged, to generate the full-resolution polarisation image.

12. The method of claim 9, wherein the polarisation mask further comprises opaque masks arranged beside at least a second predefined percent of the polarization filters and on the optical path of corresponding colour filters, wherein in the image sensor, the opaque masks block light from passing towards a first part of each photo-sensitive cell in a first set of photo-sensitive cells and a second part of each photo-sensitive cell in a second set of photo-sensitive cells, wherein the step of reading out the image data comprises reading out a plurality of image signals from the plurality of photo-sensitive cells, and wherein the method further comprises:

selecting a plurality of pairs of photo-sensitive cells from the first set and the second set, each pair of photo-sensitive cells comprising one photo-sensitive cell from the first set and another photo-sensitive cell from the second set;

for a given pair of photo-sensitive cells comprising a first photo-sensitive cell from the first set and a second photo-sensitive cell from the second set, determining a phase difference between a first image signal read out from the first photo-sensitive cell and a second image signal read out from the second photo-sensitive cell; and adjusting a focus distance of an imaging system, based on phase differences determined for the plurality of pairs of photo-sensitive cells.

\* \* \* \* \*